(12) United States Patent
Kreutzkaemper et al.

(10) Patent No.: US 12,546,439 B2
(45) Date of Patent: Feb. 10, 2026

(54) LUBRICANT PUMP

(71) Applicant: SKF Lubrication Systems Germany GmbH, Walldorf (DE)

(72) Inventors: Juergen Kreutzkaemper, Waibstadt-Daisbach (DE); Stefan Schuermann, Mühlhausen (DE); Dieter Hess, Ludwigshafen (DE); Martin Teupner, Neulussheim (DE); Markus Mandera, Leimen (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 0 days.

(21) Appl. No.: 18/645,571

(22) Filed: Apr. 25, 2024

(65) Prior Publication Data

US 2024/0369183 A1      Nov. 7, 2024

(30) Foreign Application Priority Data

May 4, 2023   (DE) .......................... 102023204125.1

(51) Int. Cl.
*F16N 7/38*      (2006.01)
*F16N 19/00*     (2006.01)

(52) U.S. Cl.
CPC ............... *F16N 7/38* (2013.01); *F16N 19/00* (2013.01)

(58) Field of Classification Search
CPC . F16N 7/38; F16N 11/00; F16N 11/04; F16N 11/08; F16N 13/00; F16N 13/02; F16N 19/00; F16N 25/02; F04B 23/02; F04B 23/025
See application file for complete search history.

(56) References Cited

U.S. PATENT DOCUMENTS

| | | | |
|---|---|---|---|
| 2,566,702 A * | 9/1951 | Harrigan | F16N 5/00 222/254 |
| 6,244,387 B1 | 6/2001 | Paluncic et al. | |
| 8,978,825 B2 * | 3/2015 | Conley | F16N 7/385 184/6 |
| 9,127,809 B2 * | 9/2015 | Conley | F16N 39/002 |
| 9,140,407 B2 | 9/2015 | Conley et al. | |
| 9,222,618 B2 * | 12/2015 | Donovan | F16N 13/02 |
| 2020/0363011 A1 | 11/2020 | Conley | |
| 2023/0417237 A1 | 12/2023 | Pisoni et al. | |

* cited by examiner

*Primary Examiner* — Minh Truong
(74) *Attorney, Agent, or Firm* — Stinson LLP

(57) ABSTRACT

A lubricant pump (1) has a reservoir unit (100) and a pump unit (200). The reservoir unit (100) has a reservoir housing (101). The pump unit (200) has a pump housing (201). The pump unit (200) and the reservoir unit (100) are separably connected. When the housings (101; 201) are connected, the openings (108; 208) are fluid-connected to one another such that lubricant can flow out of the reservoir unit (100) into the pump unit (200). First and second plates (210; 212; 810; 910) are movable such that the opening (108; 208) of the pump unit can be closed and opened. Alternatively or in addition, first and second plates (110; 112; 810; 910) are movable such that the opening (108; 208) of the reservoir unit can be closed and opened.

35 Claims, 8 Drawing Sheets

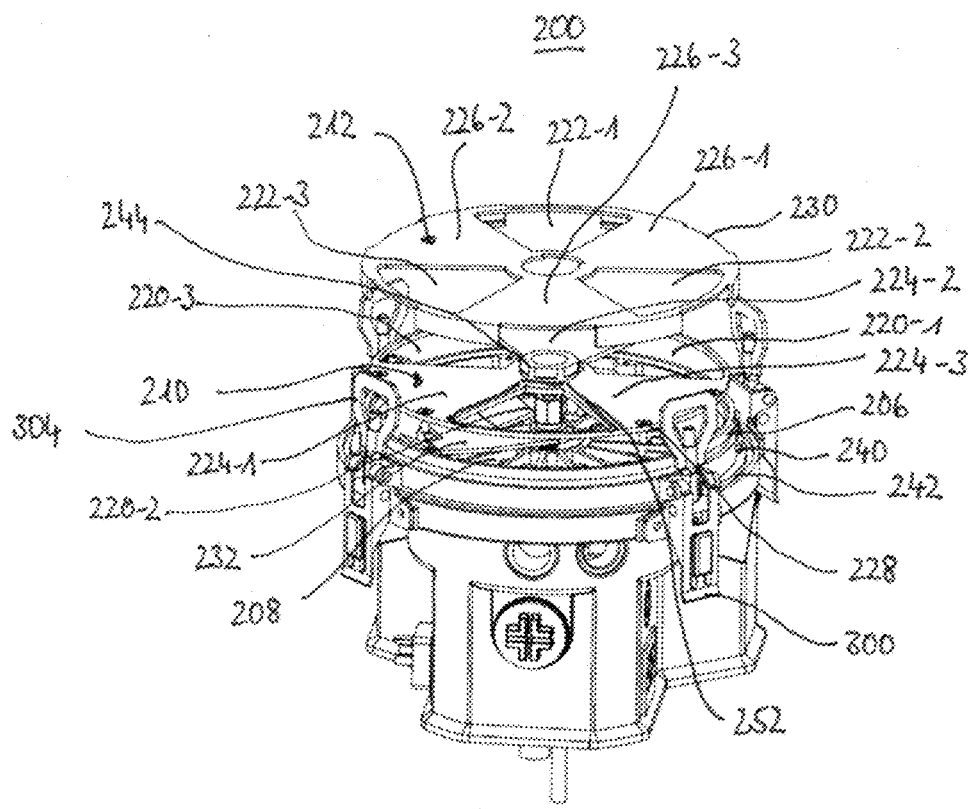
Fig. 5
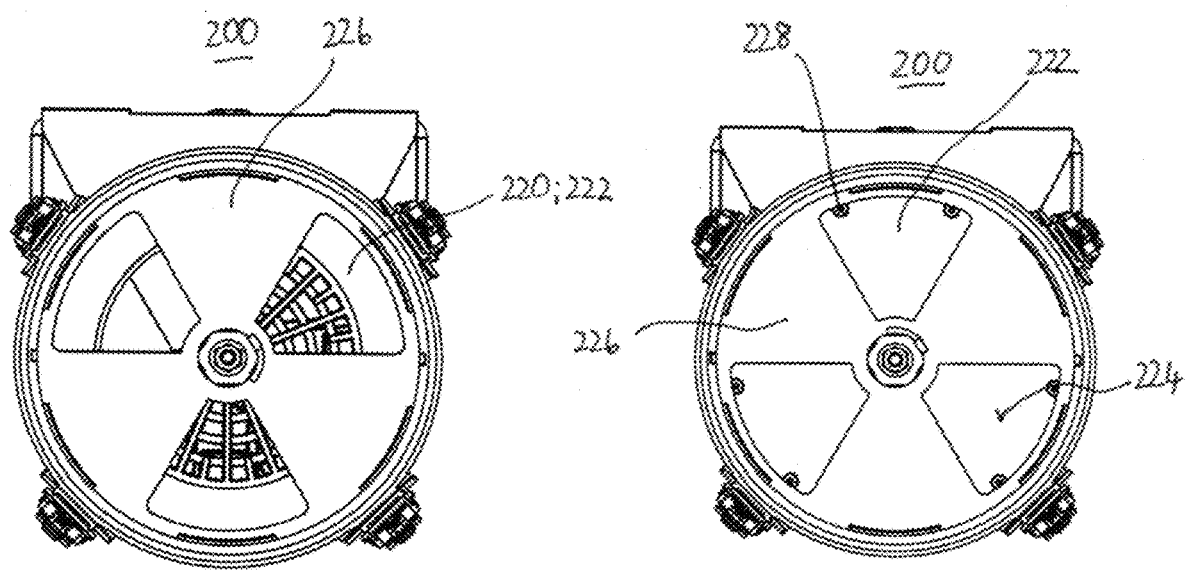
Fig. 6a
Fig. 6b

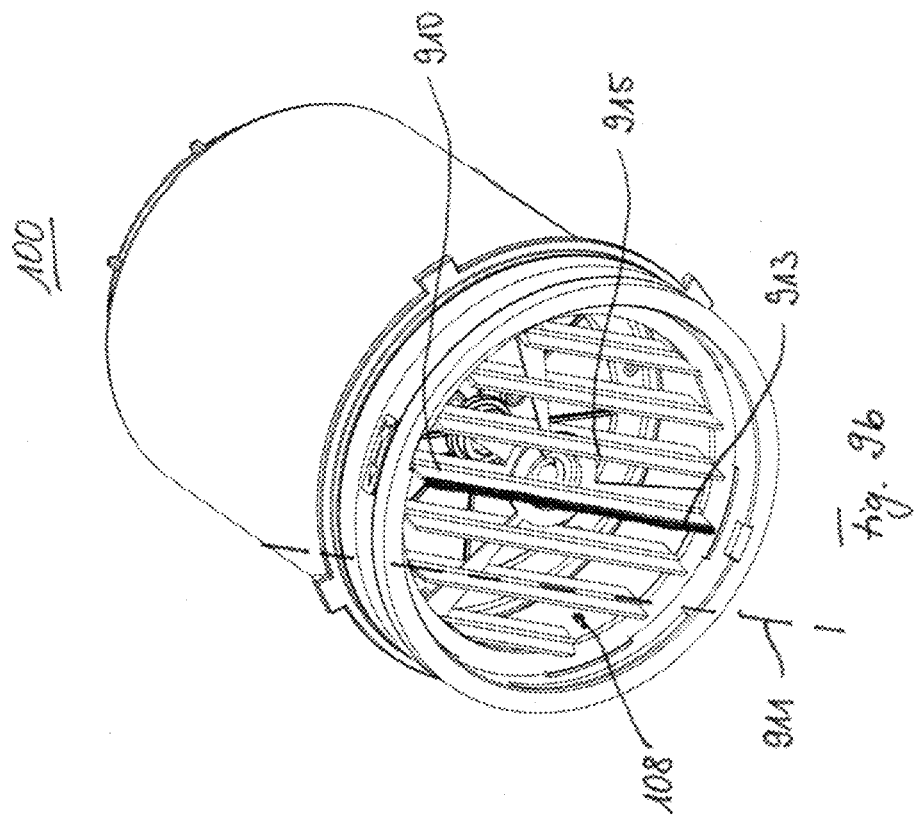
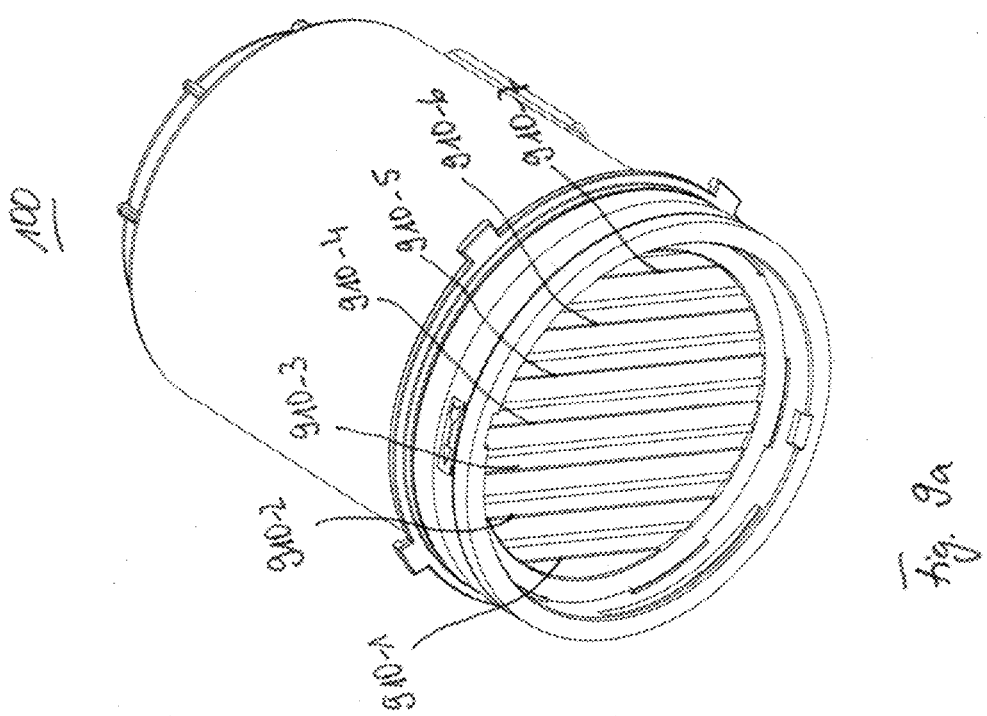

LUBRICANT PUMP

CROSS-REFERENCE TO RELATED APPLICATION

This application claims priority to German Application No. 102023204125.1, filed May 4, 2023, the entirety of which is hereby incorporated by reference.

FIELD

The present disclosure relates to a lubricant pump.

BACKGROUND

Lubrication systems for supplying mechanical components such as bearings, gearboxes etc. with lubricant generally comprise one or more pumps, which conduct the lubricant out of a reservoir to mechanical components. Such pumps can deliver the lubricant either to an interposed conveying device, for example an injection nozzle, or via hoses or liquid lines directly to the mechanical component. In most lubricant pumps, the reservoir is connected directly to a pump unit and must be refilled regularly. Usually, the reservoir is filled with new grease using mobile filling pumps during regular service intervals. This can take place via filling connections to be provided separately or via a lid on the reservoir container. To reduce the time required and thus the costs, the filling pumps have a high conveying volume, but the complex transport of a lubricant refilling vessel with the associated filling pump and the attachment of connection lines to the filling connections or the extrusion of lubricant cartridges via the lid is still time-consuming.

It has therefore been proposed in the prior art to provide an exchangeable reservoir unit instead of a fixedly mounted reservoir unit. To ensure that the pump unit and the "new" lubricant are not exposed to the environment so that dirt or air could contaminate the lubricant and the pump during changing, it has also been proposed to provide a valve at the interface between the reservoir unit and the pump unit, which valve can be opened after coupling between the pump unit and the reservoir unit. To this end, the known valve has a valve disc which, on opening, is pressed in the direction of the reservoir container interior and opens an annular gap, through which lubricant can be transferred from the reservoir unit into the pump unit.

However, a disadvantage of this solution is that the annular gap provided by the valve technology opens only a small opening region, so the lubricant transfer is hindered, in particular if viscous grease is used. In addition, the valve disc must work against the lubricant pressure in order to open the annular gap, and therefore a strong force is necessary to open the annular gap and keep it open, which force in turn requires correspondingly dimensioned valve components.

The object of the present disclosure is therefore to provide a lubricant pump which has an exchangeable reservoir and improves the aforementioned disadvantages.

SUMMARY

This object is achieved by a lubricant pump according to claim 1.

In the following, a lubricant pump is proposed, having a reservoir unit with a reservoir container for storing lubricant and a pump unit with a pump device for conveying lubricant out of the reservoir unit to a lubricant consumer. The reservoir unit has a reservoir housing and a reservoir housing connection section, and the pump unit has a pump housing with a pump housing connection section, the connection sections of the housings being separably connectable to one another. Furthermore, each connection section of the housing has an opening which provides access to an interior of the respective housing, wherein, when the housings are in the connected state, the openings are fluid-connected to one another such that lubricant can be transferred out of the reservoir unit into the pump unit.

To ensure that no lubricant escapes from the reservoir unit and that no dirt can get into the reservoir unit or the pump unit during changing of the reservoir unit, it is furthermore proposed that at least a first and a second plate are provided on the reservoir housing connection section, which are movable such that the openings of the reservoir housing connection section can be closed and opened with the plates, and/or that at least a first and a second plate are provided on the pump housing connection section, which are movable such that the opening of the pump housing connection section can be closed and opened with the plates.

It is preferred in particular when the first and second plates are arranged at least partially lying on one another and are slidable against one another in a shutter-like manner.

With the aid of the plates which are slidable against one another, a substantially larger opening cross section for the flow of lubricant from the reservoir unit to the pump unit can be realized than via the annular gap known from the prior art.

According to a further advantageous exemplary embodiment, the movement takes place in the form of a sliding movement of the plates for opening and closing the openings and takes place substantially perpendicularly to a transfer direction of the lubricant from the reservoir unit into the pump unit. Because of the sliding movement of the plates perpendicularly to the transfer direction of the lubricant, they do not have to work against the lubricant pressure when the fluid connection between the reservoir unit and the pump unit is opened. A large opening cross section can thus be provided, which also requires a small application of force for opening.

According to a further preferred exemplary embodiment, the plates at at least one of the openings are designed as multiple lamellae, each of which is rotatable about its own rotational axis. The rotational axes can be substantially parallel or perpendicular to a transfer direction of the lubricant out of the reservoir unit into the pump unit. It is advantageous in particular when the lamellae are similar to a camera shutter and partially overlap one another in order to close a centrally situated opening. In this case, the rotational axes are preferably parallel to the transfer direction.

However, if the rotational axes are arranged substantially perpendicularly to the transfer direction, the lamellae can be rotated and open the opening in a similar manner to a Venetian blind. In this case, the plates can also merely abut one another. To achieve even better sealing, at least one seal element can also be provided at the abutting edges or bearing edges. The sealing elements preferably overlap one another in order to form a sealing closure. According to a further preferred exemplary embodiment, it is also possible for a seal element to be provided only on one of the abutting edges, which seal element preferably extends to the other plate and partially overlaps same.

According to a further advantageous exemplary embodiment, the plates at at least one of the openings are disc-like and rotatable about a common rotational axis, the rotational axis being substantially parallel to a transfer direction of the lubricant out of the reservoir unit into the pump unit. The opening or openings formed by such a plate design is/are usually arranged not centrally but in a circular ring around the rotational axis. In this exemplary embodiment, the rotational axis of the plates coincides with an imaginary centre line which extends through the openings of the connection sections.

Particularly preferred is an embodiment in which the disc-shaped plates each have at least one, preferably three, window openings, wherein the window openings can be aligned flush with one another by sliding the plates so that the opening of the reservoir housing connection section and/or the opening of the pump housing connection section can be opened or closed.

Preferably, the openings of the two plates arranged over one another are not dimensioned the same but are designed such that the plates also partially overlap one another when in the open state. This can ensure that lubricant cannot escape outwards past the abutting edges of the discs in the closed state.

According to a further advantageous exemplary embodiment, the first plate of the pump unit is designed as a pump unit plate which is stationary in relation to the pump housing connection section, and the second plate of the pump unit is designed as a pump unit plate which is movable in relation to the pump housing connection section, and/or the first plate of the reservoir unit is designed as a reservoir unit plate which is stationary in relation to the reservoir housing connection section, and the second plate of the reservoir unit is designed as a reservoir unit plate which is movable in relation to the reservoir housing connection section. As a result, a lubricant pump can be provided which allows a simple closure of the connection openings of the pump unit and the reservoir unit without an excessive number of movable elements having to be provided.

It is advantageous in particular when the stationary pump unit plate can be connected to the pump housing by means of a screw fastening, and/or the reservoir unit has a plate insert, the plate insert being connectable to the reservoir housing connection section in a rotationally fixed manner, in particular via a frictional fit, and the plate insert being formed integrally with the stationary reservoir unit plate.

Alternatively, the stationary reservoir unit plate can of course also be attached to the reservoir housing by means of a screw connection. It is likewise possible for the pump unit alternatively or additionally to have a plate insert as well. Of course, an integral design of the stationary plates with the associated housing can also be possible. Other possibilities of connecting the stationary plates separably or inseparably to the associated unit are also included in the scope of the present disclosure.

The use of plate inserts and/or the combination of the screw connection and the plate insert also allows already existing lubricant containers to be retrofitted with a closure unit.

According to a further preferred exemplary embodiment, the stationary pump unit plate has at least one engagement element or coupling element, which is designed to interact with the movable reservoir unit plate such that the movable reservoir unit plate is connectable in a rotationally fixed manner to the stationary pump unit plate and is thus arranged in a stationary manner in relation to the pump unit, and a sliding movement of the plates of the reservoir unit takes place via a rotation of the reservoir unit in relation to the pump unit so that, when the reservoir unit is rotated, the reservoir unit plate which is stationary in relation to the reservoir unit is moved over the movable reservoir unit plate.

In other words, the first/stationary plate of the reservoir unit is only stationary in relation to the reservoir unit itself. The rotation of the reservoir unit with the first plate fastened thereto means, however, that in terms of the overall lubricant pump system the first/stationary plate appears movable, while the second/movable plate appears stationary.

It is also advantageous when the stationary reservoir unit plate also has at least one coupling element, which is designed to interact with the movable pump unit plate such that the stationary pump unit plate is connectable in a rotationally fixed manner to the stationary reservoir unit plate and is thus arranged in a stationary manner in relation to the reservoir unit, and a sliding movement of the plates of the pump unit takes place via a rotation of the reservoir unit in relation to the pump unit so that, when the reservoir unit is rotated, the stationary reservoir unit plate moves the movable pump unit plate.

With the aid of this design, it is made possible for the plates to be moved by the rotation of the reservoir housing in relation to the pump housing such that the openings are opened or closed. Further drives for moving the plates can then be omitted.

To ensure that lubricant cannot also enter an interstice between the first and second plates, it is also advantageous to provide at least one sealing element, which is preferably arranged around the window opening(s). This seal can be metallic, but it is also possible to realize injection-moulded sealing lips or a design in plastic or rubber.

According to a further advantageous exemplary embodiment, the pump unit and/or the reservoir unit have at least one actuation element, which is designed to effect a rotation of the plates against one another.

The actuation element can for example be designed as an outwardly extending pin, which is moved manually from the outside and brings the plates into the corresponding open or closed position. Alternatively, a movement of the plates can also be enabled with the aid of a magnet, which acts on the slidable plate. Electrical actuation elements are also equally conceivable.

The actuation element can also be formed integrally with the respective movable plate. It is also preferred for the actuation of the actuation element and thus sliding of the plates to take place via an interaction between the connection sections. For instance, a rotation of the plates relative to one another can be achieved with the aid of a rotary movement at the same time when the reservoir unit is inserted into the pump unit, as already mentioned above.

According to a further preferred exemplary embodiment, the pump unit and/or the reservoir unit are equipped with at least one rotary angle limiting element, which is designed to limit a rotation of the plates against one another to a certain angle. This can ensure that the openings are not unintentionally closed again by "over-rotation".

According to a further advantageous exemplary embodiment, the lubricant pump also has at least one securing element, which is designed to secure the slidable plates in their open or closed position. The securing element can also be designed as an integral part of the plates or housing. For example, a latching element can be provided, which latches in when the slidable plate is in its open and/or closed position. The securing element can also act as the rotary angle limiting element at the same time, so that an operator knows that the openings are open or closed.

Furthermore, an exemplary embodiment is preferred in which the reservoir unit and/or the pump unit are equipped with at least one positioning aid in order to define a certain position between the pump unit and the reservoir unit and/or between the first and the second plate in each case. This can ensure that an operator is provided with information as to whether the openings are open or closed and/or to what extent they are open or closed.

For example, one or more marking(s) can be made on the respective pump unit or reservoir unit, so that an operator knows from the markings whether the opening is open or closed.

Of course, suitable sensors can also be provided, which can detect an open or closed state and output same to the operator via an appropriate interface.

According to a further preferred exemplary embodiment, the reservoir housing connection section and/or the pump housing connection section and/or the first and/or the second plates have at least one projection, which interacts with at least one recess formed in the respectively other connection section or plate. This combination of projection and recess can be designed as an actuation element and/or as a positioning aid and/or as a rotary angle limiting element and/or as a securing element.

According to a further advantageous exemplary embodiment, at least one locking element can also be provided on the pump unit and/or the reservoir unit, which locking element is used to secure the separable connection between the pump unit and the reservoir unit. For example, clamps, screws, pins or other locking mechanisms can be provided on the lubricant pump for this purpose.

According to a further advantageous exemplary embodiment, the reservoir unit and the pump unit are connected to one another by means of a bayonet closure system. The bayonet closure can be designed such that it interacts with an actuation element so that a rotation of the reservoir unit in the bayonet closure leads to a simultaneous opening of the slidable plates. For example, projections can be provided for this purpose on the stationary plate of the reservoir unit, which engage in recesses in the movable plate of the pump unit and slide the rotatable plate into the open position when the reservoir unit is rotated in relation to the pump unit in the bayonet closure.

The bayonet closure can be realized for example with the aid of an L-shaped groove which an engagement element attached to the respectively other unit enters and is slid in the L-shaped groove as far as the end of the long side, opening the openings in the process.

With the aid of the bayonet closure, the reservoir unit can also be secured against separation of the connection in the axial direction. The above-described securing elements and/or locking element can also be used to prevent unintentional rotation of the reservoir unit in the pump unit.

For instance, the projection element engaging in the groove of the bayonet closure can also be resilient and snap into a depression formed at the end of the groove, so further locking elements can be omitted. At the same time, this design provides the advantage that the slidable plates are secured in their open position.

According to a further advantageous exemplary embodiment, the reservoir unit has a reservoir container with a guide rod, wherein a rotatable agitator element, in particular an agitator blade, is provided on the guide rod, which agitator element is arranged in the region of the connection section between the plates and the reservoir container. With the aid of the agitator blade, lubricant can be pushed in the direction of the openings so that the lubricant flow is significantly supported. This is advantageous in particular at colder temperatures, at which lubricating grease or even lubricating oil has a very high viscosity, to transfer lubricant out of the reservoir container into the pump unit. Furthermore, lubricant which is arranged next to the window openings can be transported in the direction of the window openings and transferred into the pump unit.

Furthermore, it is advantageous for a following disc also to be arranged on the guide rod, which following disc pushes the lubricant present in the reservoir container in the direction of the connection section openings. The following disc can in particular be spring-loaded.

According to a further preferred exemplary embodiment, the guide rod can also be used to initiate a rotation of the first or second plates and thus to provide an opening and/or closing of the lubricant transfer openings. To this end, corresponding coupling elements can be provided on the guide rod and on the plates. In such a design, a rotation of the reservoir unit in relation to the pump unit is not necessary, and therefore corresponding rotation mechanism elements can be omitted. In this case, locking elements again provide locking of the connection between the pump unit and the reservoir unit.

According to a further advantageous exemplary embodiment, the pump unit also has an agitator element, in particular an agitator blade, which is preferably arranged in the region of the pump housing connection section between the plates and the pump device. With the aid of the agitator blade, lubricant which has been transferred from the reservoir container into the pump unit can be conducted in the direction of a pump device in order to convey the lubricant in the direction of the consumer with the aid of the pump device.

Furthermore, it is preferred when the pump unit has a drive device with a rotatable shaft, and the rotatable shaft is connected in a rotationally fixed manner to the agitator element of the pump unit.

According to a further advantageous exemplary embodiment, a clutch element is also provided, which connects either the first and second agitator elements and/or the drive shaft and the guide rod to one another so that the first and the second agitator element are rotatable simultaneously with the same drive. To this end, for example the second agitator blade can have a hollow shaft into the interior of which the drive shaft is inserted, and the second agitator blade can likewise have a hollow shaft which is connectable in a rotationally fixed manner to the hollow shaft of the second agitator blade.

Further advantages and advantageous embodiments are specified in the description, the drawings and the claims. In particular, the combinations of features specified in the description and in the drawings are purely exemplary, and therefore the features can also be present individually or in other combinations.

The present disclosure will be described in more detail below using exemplary embodiments shown in the drawings. The exemplary embodiments and the combinations shown in the exemplary embodiments are purely exemplary and are not intended to define the scope of protection of the present disclosure. This is defined solely by the attached claims.

BRIEF DESCRIPTION OF THE DRAWINGS

In the figures:

FIG. 5: shows a schematic diagram of the pump unit of FIG. 1 assembled;

FIG. 6: shows a schematic diagram of the pump unit of FIG. 1 in an open (FIG. 6a) and closed (FIG. 6b) state;

FIG. 9: shows a schematic diagram of the reservoir unit according to a fourth preferred exemplary embodiment in the closed (FIG. 9a) and open (FIG. 9b) state.

DETAILED DESCRIPTION

In the following, identical or functionally equivalent elements are denoted by the same reference signs.

Figure 1:
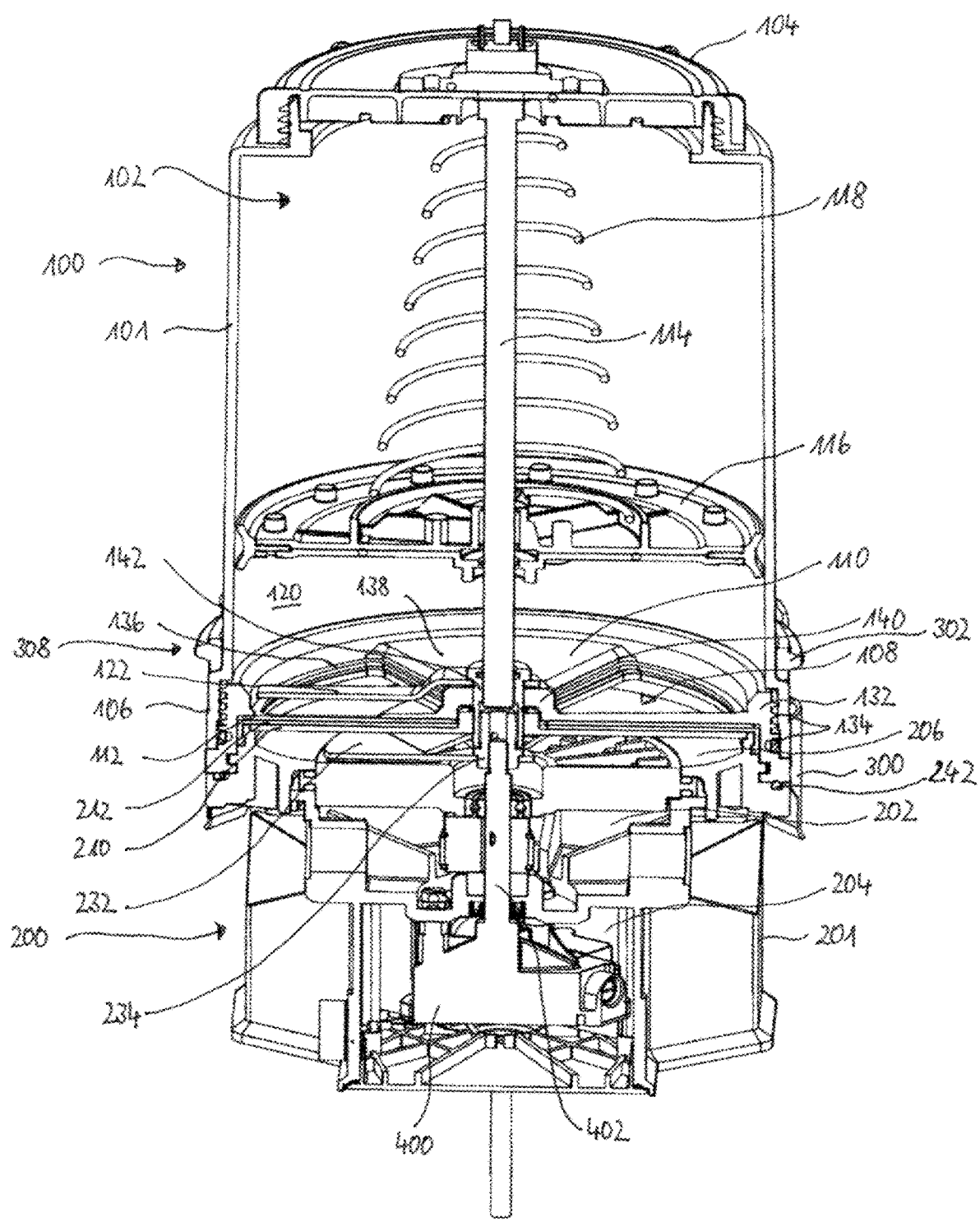
FIG. 1: shows a schematic diagram of a first preferred exemplary embodiment of a lubricant pump.

FIG. 1 schematically shows a sectional view of a lubricant pump 1 having a reservoir unit 100 and a pump unit 200, which can be connected separably to one another.

Figure 2:
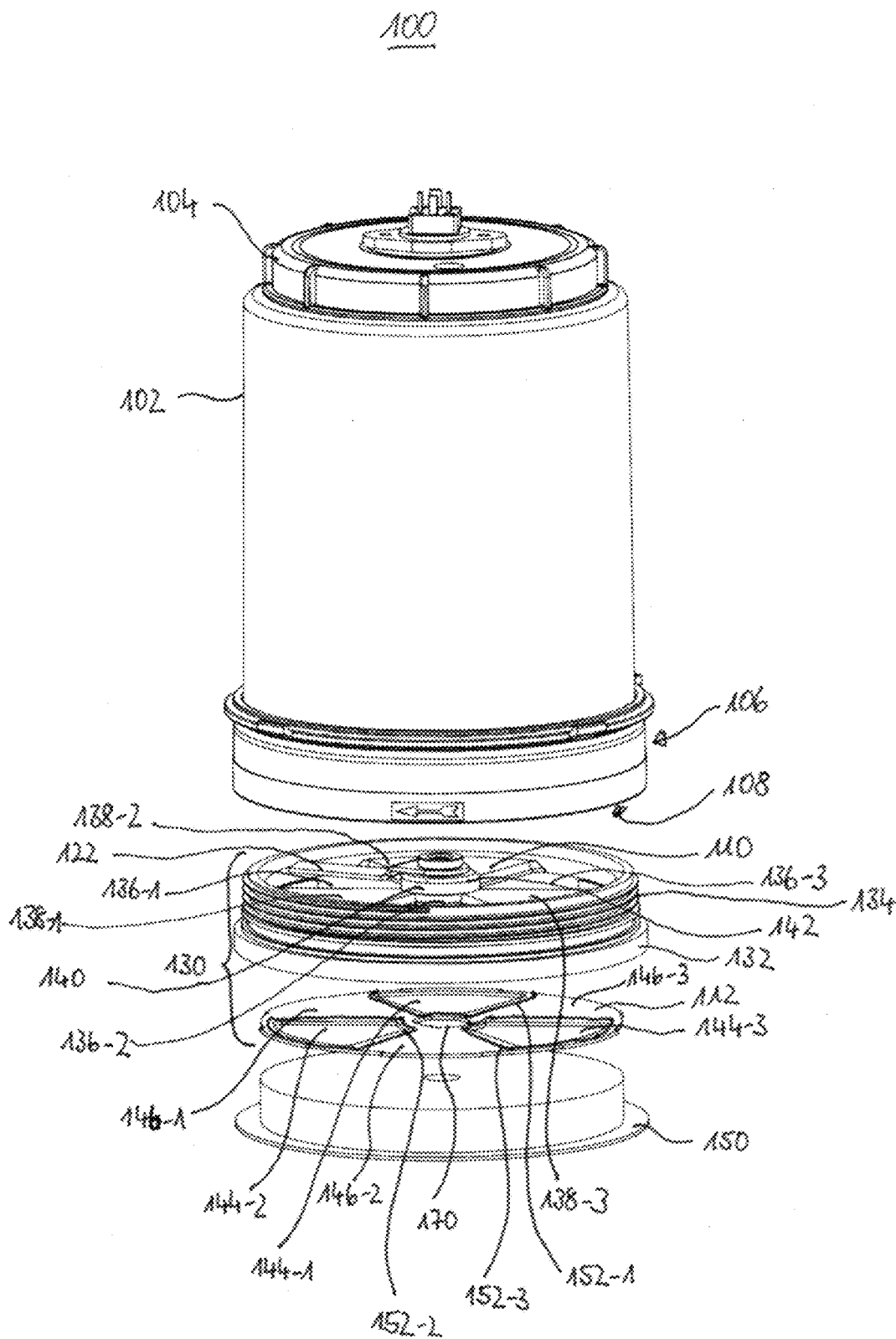
FIG. 2: shows a schematic diagram of the reservoir unit from FIG. 1 in an exploded diagram.
Figure 3:
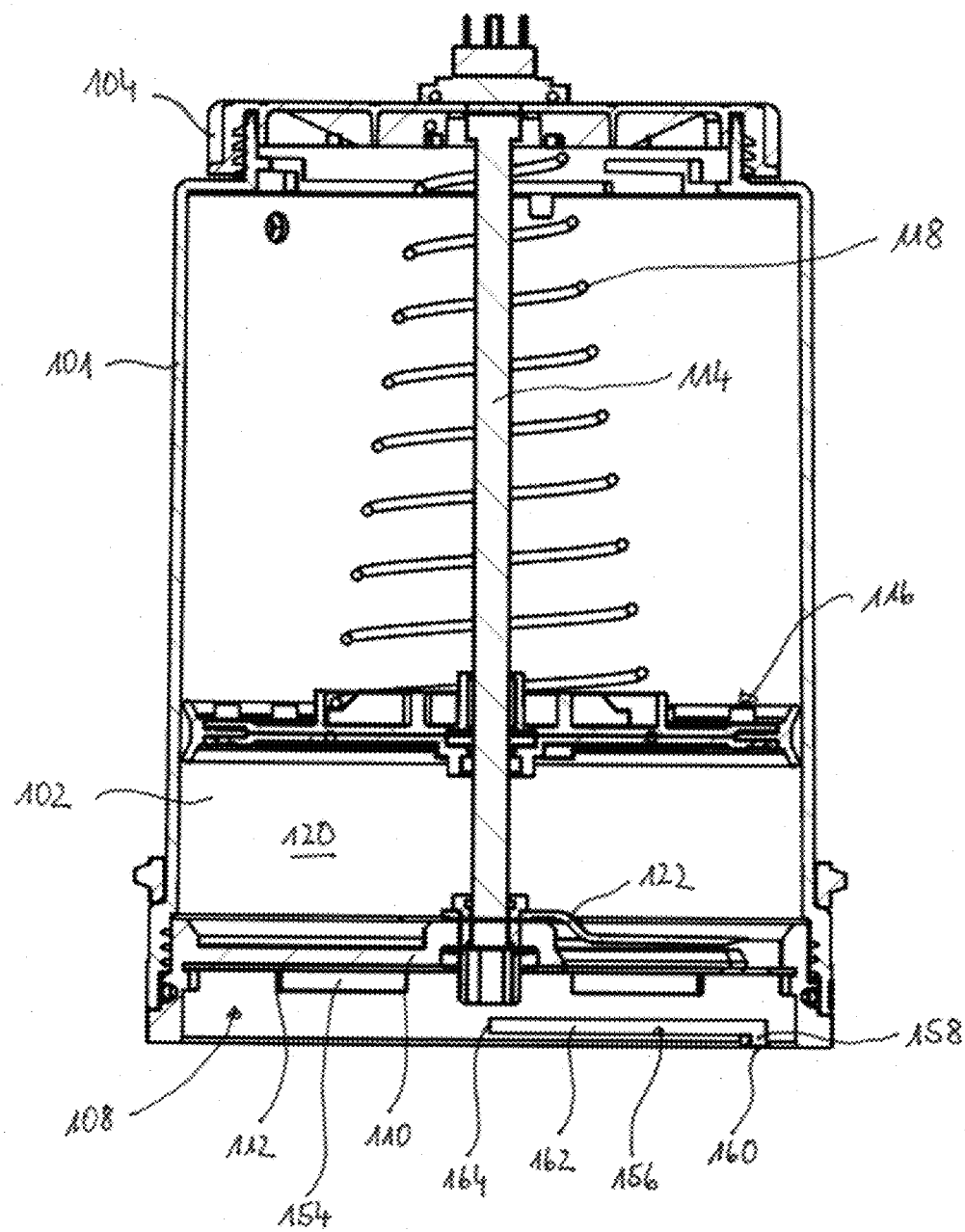
FIG. 3: shows a schematic diagram of the reservoir unit of FIG. 1 assembled.

As can be seen FIG. 1 and in detail in FIGS. 2, 3 and 4, the reservoir unit 100 has a housing 101, which comprises a reservoir container 102 in which lubricant can be introduced and stored. The reservoir housing and thus the reservoir container 102 can be closed at its upper side by means of a lid element 104, via which the container can also be filled with lubricant. To this end, the lid element 104 can be connected separably to the container 102 or the housing 101. On the opposite side of the lid element 104, the reservoir housing 101 has a reservoir housing connection section 106. The reservoir housing connection section 106 also has an opening 108 (see also FIG. 3), which is closable by means of plates 110, 112 (see in particular FIG. 2) which are slidable against one another.

It can also be seen in FIG. 1 and FIG. 3 that a centrally arranged guide rod 114 is provided in the lubricant container 102, on which guide rod a following disc 116 is mounted, which is designed to apply force to lubricant present in the container 102 and to push same in the direction of the opening 108. For example, a spring element 118 is provided for this purpose. In the exemplary embodiment shown here, lubricant would be received in the lubricant receiving space 120 of the lubricant container 102 between the following disc and the opening 108. Furthermore, it can be seen in FIGS. 1 and 3 that an agitator element 122, which pushes lubricant in the direction of the opening 108, is provided between plates 110, 112 and the following disc 116, that is, in the lubricant receiving space 120.

FIG. 2 shows, in an exploded diagram, the components of the reservoir unit 100, wherein it can clearly be seen that a closure element 130 which receives or forms the two plates 110 and 112 is inserted into the connection section 106 or the opening 108 which is provided by the connection section 106.

In the exemplary embodiment shown, the closure element 130 consists of a stationary unit 132, in particular a plate insert, which is inserted sealingly in the housing 102, more precisely in the connection section 106. For this purpose, the unit 132 has laterally or circumferentially arranged sealing elements 134, which bear sealingly against the inner wall of the connection section 106. The sealing elements 134 can be realized by O-rings, for example. The element 132 can for example be inserted in the connection section 106 of the reservoir unit 100 by means of a frictional fit (owing to the sealing element 134).

Furthermore, FIG. 2 shows that the plate 110 which is stationary in relation to the reservoir unit 100 is formed integrally with the element 132. In the exemplary embodiment shown here, the stationary plate 110 has three segment-like window openings 136-1, 136-2, 136-3, which are separated from one another by stationary segments 138-1, 138-2, 138-3. In the centre, the stationary segments 136 are fastened to or merge into a ring element 140, which at the same time forms a hollow hub for receiving a shaft 142 of the agitator blade 122 so that the agitator blade 122 or its shaft 142 is mounted rotatably on the ring element 140.

To close the window openings 136, the movable plate 112 is also provided in the closure device 130, which movable plate has, analogously to the window openings 136 of the stationary plate 110, window openings 144-1, 144-2, 144-3, which are again separated by segments 146-1, 146-2, 146-3. The plate 112 is movable and can rotate within the stationary element 132. Furthermore, the segments 148 of the movable plate 112 are dimensioned such that they can cover the window openings 136 of the stationary plate 110 in the closed state. In an open state, however, the window openings 136 and the window openings 144 are aligned flush with one another in order to allow the largest possible opening for the passage of lubricant from the reservoir unit 100 into the pump unit 200. For transport, a lid element 150 can also be provided, which ensures that the movable plate 112 does not rotate unintentionally and open an opening. At the same time, the lid element 150 protects against dirt and damage and can act as an additional seal against the environment during transport. The lid element 150 is removed before the reservoir unit 100 is inserted into the pump unit 200.

Seal elements 152 can also be provided on the stationary element 132 or on the stationary plate 110 and/or on the movable disc 112, which seal elements seal an interstice between the slidable plates 110 and 112. These sealing elements 152 can be formed for example as rubber elements vulcanized on the disc 112 and preferably extending around the window openings 144.

Figure 4A:
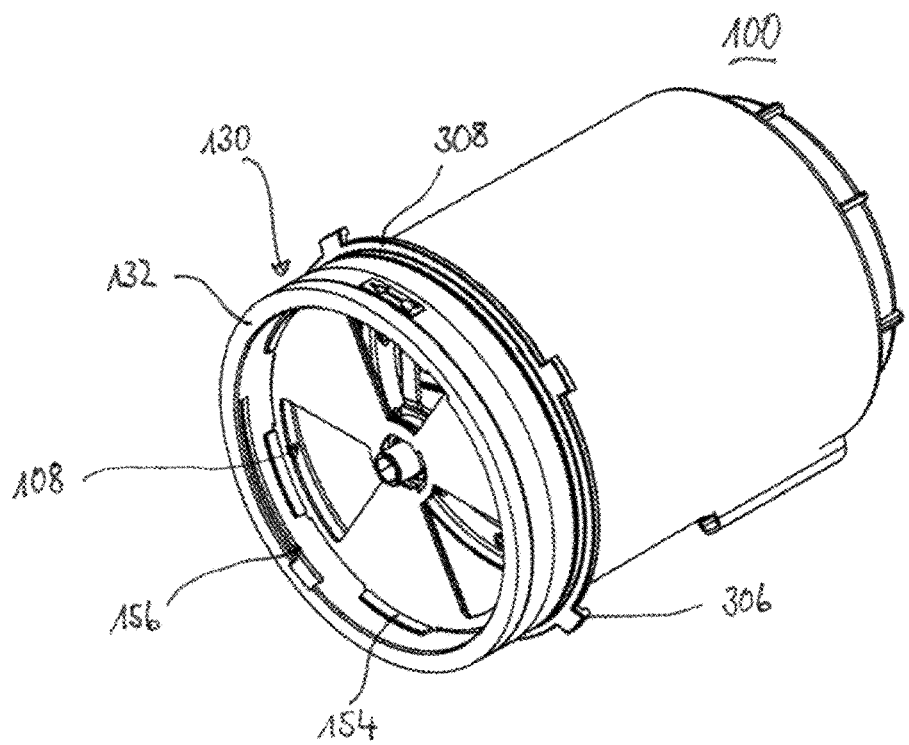
FIG. 4: shows a schematic diagram of the reservoir unit of FIG. 1 in an open (FIG. 4a) and closed (FIG. 4b) state.
Figure 4B:
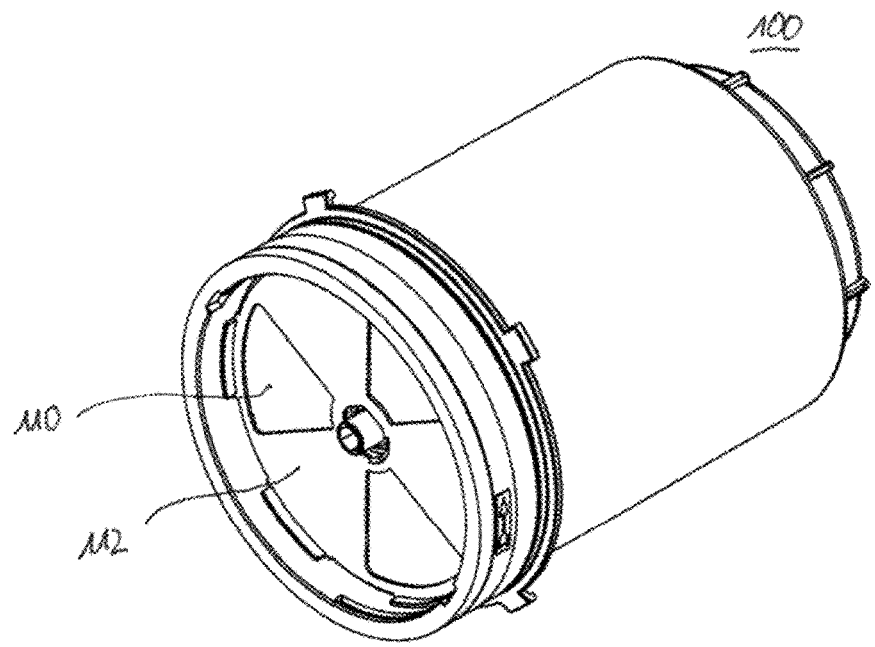

FIG. 4 shows a schematic view of the reservoir unit 100 from below in the assembled state. FIG. 4a shows the reservoir unit 100 in the open state, and FIG. 4b shows the reservoir unit 100 in the closed state.

As can also be seen in FIGS. 3 and 4, the stationary element 132 has, on its cylindrical inner lateral face, projections 154 and an L-shaped groove 156, which interact with elements of the pump unit and the function of which will be discussed later.

The pump unit 200, which is shown in particular in FIG. 1 and FIG. 5, can be connected separably to the reservoir unit 100. As can be seen in FIG. 1 and FIG. 5, the pump unit 200 also has a housing 201, which forms a first chamber 202 in which lubricant can be received. Furthermore, the housing 201 has a second chamber 204, which is substantially lubricant-free and in which, inter alia, a drive, conveying elements, monitoring elements and further components of a lubricant pump device which are used to conduct lubricant from the reservoir unit 100 via the pump device 200 in the direction of a consumer can be provided or accommodated.

So that the pump elements and in particular the first chamber 202 are not contaminated when the separable reservoir unit 100 is lifted off, the pump housing 202 also has a connection section 206 with an opening 208 which is open in the direction of the reservoir unit and which can be closed and opened by means of plates 210, 212 (see in particular FIG. 5) which are slidable relative to one another.

Analogously to the reservoir unit 100, the pump unit 200 also has a first stationary plate 210 and a second rotatable plate 212, which are each equipped with three window openings 220 and 222, respectively, which are separated via segments 224 and 226, respectively, situated therebetween, wherein the window openings 220, 222 lie flush one above the other in order to provide an opening in the open state (see FIG. 6*a*). In the closed state (see FIG. 6*b*), however, the segments 224 and 226 situated therebetween cover the window openings 220 and 222. The stationary plate 210 can be fastened in a rotationally fixed manner to the pump housing 201 by means of screw connections 228, for example. Other fastenings are likewise possible.

It can also be seen in the view of FIG. 5 that recesses 230 are provided in the movable plate 212 of the pump unit 200, into which recesses the projections 154 shown in FIGS. 3 and 4 can engage.

FIGS. 6*a* and 6*b* again show the pump unit 200 in the open (FIG. 6*a*) and closed (FIG. 6*b*) state. As can be seen in the view of FIGS. 6*a* and 6*b*, the movable plate 212 is designed such that it at least partially overlaps the stationary plate 210 in every state, so that it is ensured that dirt cannot get past abutting edges between the plates 210; 212 into the interior of the pump unit 200 even in the closed state. To this end, the window opening 220 of the movable plate can for example be smaller than the window opening 222 of the stationary plate, so that the covering segments 226 of the movable plate 212 overlay the stationary segments 224 of the stationary plate in an edge region.

Such a design can also be selected for the plates of the reservoir unit 100.

As already noted with respect to the plates 110 and 112 of the reservoir unit 100, a sealing unit (not shown) can be provided in this edge region, which sealing unit extends around the window openings 220; 222 and ensures that lubricant or even dirt cannot get into an interstice between the plates 210 and 212.

FIG. 1 and FIG. 5 also show that an agitator element 232, which is mounted rotatably on a drive shaft 232, can likewise be provided in the region of the connection section 206 of the pump unit 200. The agitator element 232 is used to transfer lubricating grease which has been conducted through the window openings 220 and 222 into the lubrication pump device (not shown). As can also be seen in FIGS. 1 and 5, the agitator element 232 also has a hollow shaft 234 which is coupled in a rotationally fixed manner to the hollow shaft 142 of the agitator blade 140 of the reservoir unit 100.

In order to actuate the two agitator blades 232 and 140, a drive unit 400 is also provided, which is arranged in the second chamber 204 of the pump unit 200 and is designed to rotate a drive shaft 402. The drive shaft 402 in turn extends into the hollow shaft 234 of the agitator blade 232 and is coupled in a rotationally fixed manner to the hollow shaft, for example via teeth. When the shaft 402 is rotated, both the agitator blade 232 of the pump unit 100 and the agitator blade 140 of the reservoir unit 100 are then rotated.

The shafts 234 and 142 of the agitator blades 232 and 140, respectively, extend through centre openings in the plates 110, 112, 210, 212 and are arranged freely rotatably in same.

To allow the openings 108 and 208 of the reservoir unit 100 and of the pump unit 200, respectively, to be opened and closed, the plates must be rotated by 60° relative to one another in the exemplary embodiment shown.

An interaction of the L-shaped groove 156 (see FIG. 3) made in the cylinder wall with a projection 240 (see FIG. 5) on the pump unit 200 is used for this purpose. The projection 240 is designed to engage in the groove 156 and to be slid therein in the manner of a bayonet closure. To this end, the short side 158 of the groove 156 is open towards a lower edge 160 of the inner lateral face of the element 132 so that the projection 240 can be received in the groove 156. The projection 240 itself is then dimensioned such that, when the reservoir housing 101 is placed in a seat 242 designed therefor on the pump unit 200, said projection can be inserted into the long side 162 of the groove 156 by rotation of the reservoir unit and slid as far as a stop 164 by further rotation of the reservoir unit 100. Of course, the pump unit 200 can also be rotated instead of the reservoir unit 100. A sealing device, for example in the form of an O-ring, which seals the connection point between the reservoir housing and the pump unit, can also be arranged on the seat 242.

The length of the long side 162 of the groove 156 is dimensioned such that a rotation by 60° has taken place when the end stop 164 is reached. At the same time, the receiving of the projection 240 in the long side 162 ensures that the reservoir unit 100 can no longer be removed axially from the pump unit 200.

In order also to rotate the plates 110, 112, 210, 212 with the aid of the defined rotation by 60° such that the window openings lie flush over one another, the projections 154 of the element 132 are dimensioned such that they can engage in the recesses 230 of the movable plate of the pump unit 200. If the reservoir unit 100 and thus also the element 132 connected thereto in a stationary manner is then rotated by 60°, the movable plate 212 of the pump unit 200 is also rotated by 60°. The closure on the pump unit 200 is thereby opened or closed.

For the opening and closing of the closure on the reservoir unit likewise with the aid of the rotation of the reservoir unit relative to the pump unit, the stationary plate 210 of the pump unit 200 centrally has an engagement device 244, which is hexagonal in the case shown. The movable plate 112 of the reservoir unit 100 likewise has a receptacle 170 which is complementary to the engagement device 244 and in which the engagement device 244 can be received such that a rotationally fixed connection between the stationary plate 210 of the pump unit 200 and the movable plate 112 of the reservoir unit 100 can be provided. The engagement element 244 interacts with the movable plate 112 of the reservoir unit 100 and secures this in its position during a rotation of the reservoir unit 100 by 60°, so that the window openings 136 and 144 of the reservoir unit can also be opened and closed by the rotation of the reservoir unit 100.

In other words, the plate 112 is movable in the reference system of the reservoir unit 100, but if the lubricant pump 1 as a whole or the movement during assembly is considered, the plate 112 would remain stationary and the plate 110 together with the reservoir unit 100 would move over the plate 112 when the reservoir unit 100 is rotated.

Figure 7:
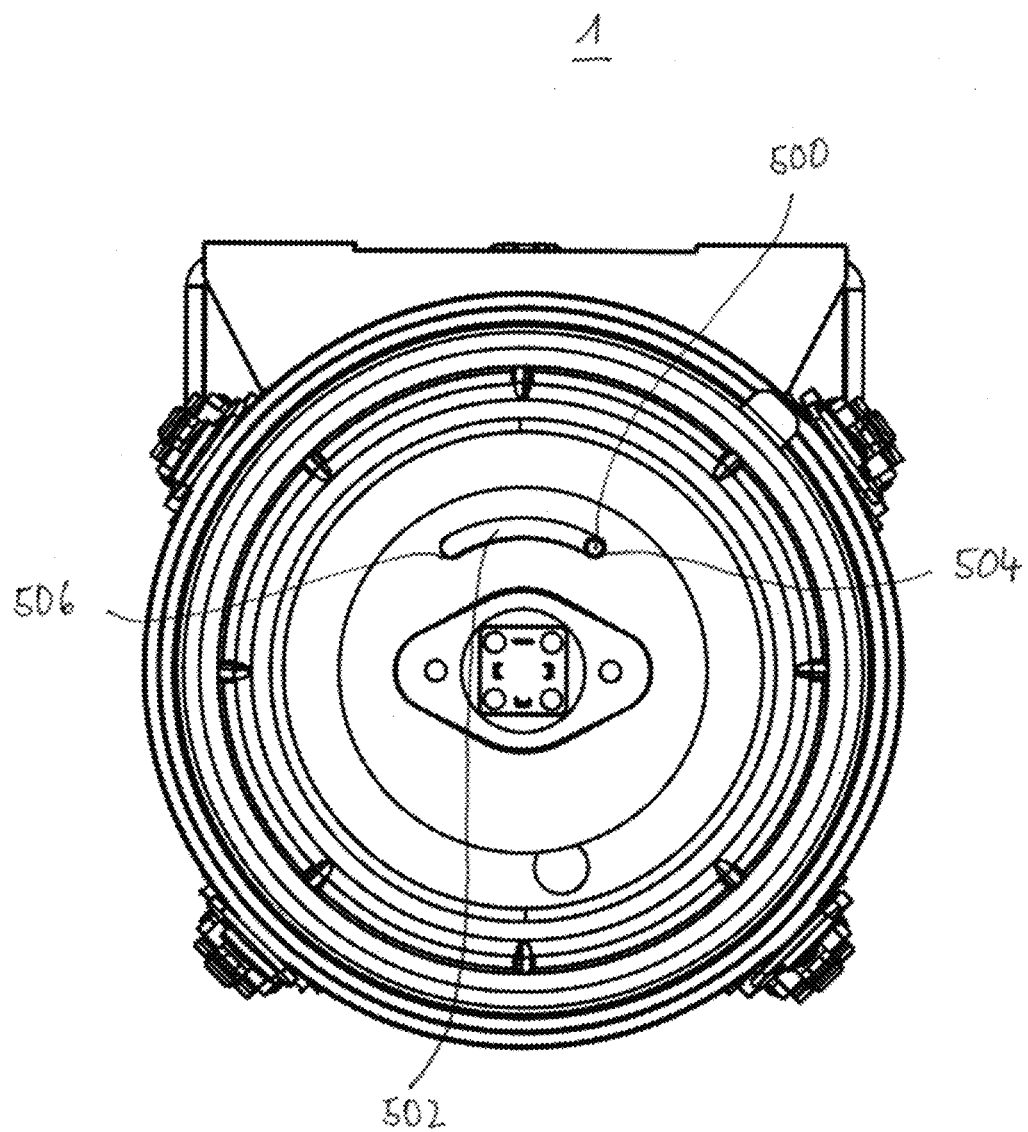
FIG. 7: shows a schematic diagram of a second preferred exemplary embodiment of a lubricant pump.

FIG. 7 shows a plan view of the plates of a further preferred exemplary embodiment in which the opening and closing of the window openings 144, 136, 220 and 22 does not take place via an interaction of a projection 240 in an L-shaped groove 156 but instead positioning pins 500 are attached to the plates themselves, which positioning pins extend for example through an arcuate opening 502 and can be slid therein. In this case too, the arcuate opening 502 forms stops 504 and 506, which define the open position and the closed position of the plates.

To secure the separable connection between the pump unit 200 and the reservoir unit 100 after assembly, locking elements 300 are also provided, as can be seen in FIGS. 1, 4 and 5, which locking elements are designed as clamps in the exemplary embodiment shown here, which interact with a correspondingly shaped counterpart 302 on the reservoir unit 100 in order to connect the reservoir unit 100 and the pump unit 200 securely to one another. To this end, the clamps 300 have tabs 304, which can engage in corresponding hooks 306, which are formed on a ring 308 fitting around the reservoir housing 101. Of course, other locking elements are also possible, for example a screw connection or another clamp connection.

Figure 8B:
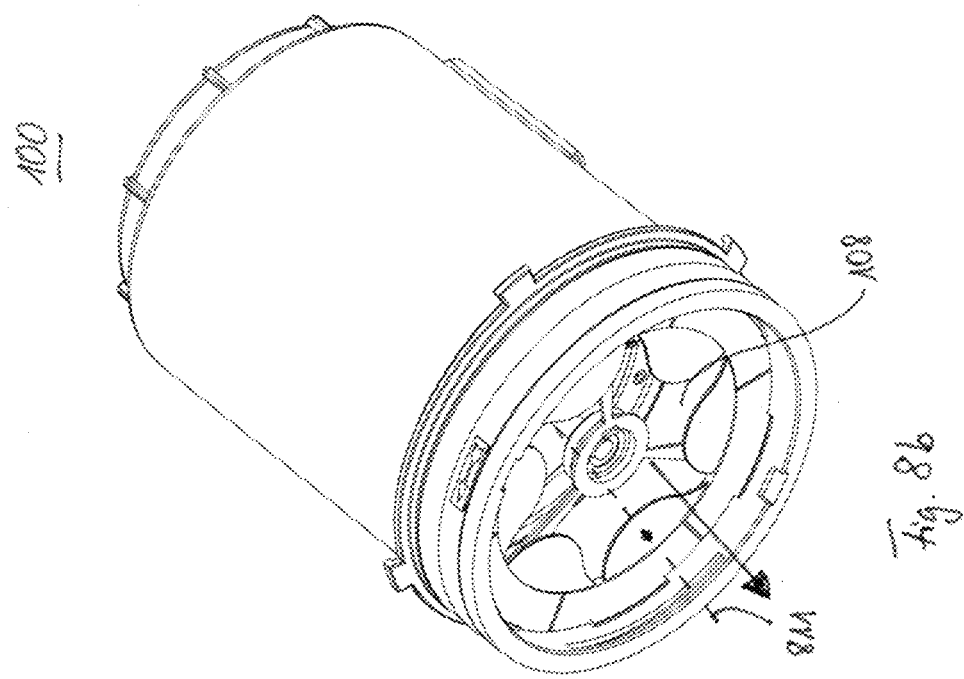
FIG. 8: shows a schematic diagram of the reservoir unit according to a third preferred exemplary embodiment in the closed (FIG. 8a) and open (FIG. 8b) state.
Figure 8A:
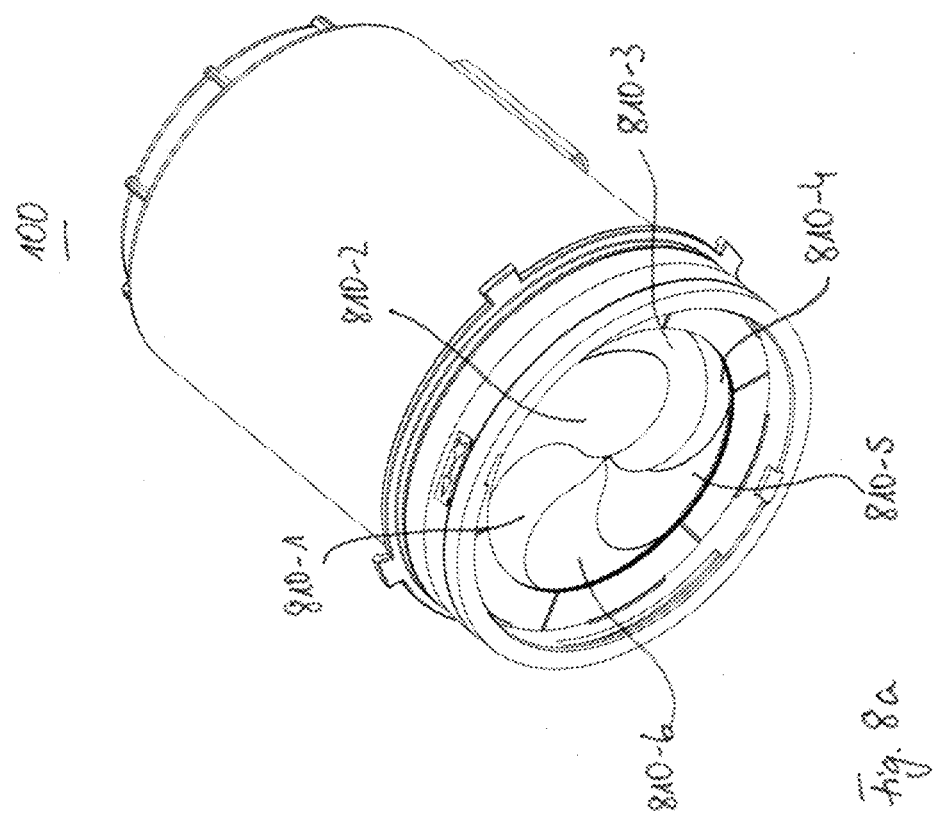

Instead of the above-described sliding of the plates along a common rotational axis, each plate can also be rotated about its own rotational axis. FIGS. 8 and 9 each show a schematic view of the reservoir unit 100 from below in the assembled state. FIGS. 8a and 9a show the reservoir unit 100 in the closed state, and FIGS. 8b and 9b show the reservoir unit 100 in the open state.

In the solution shown in FIG. 8, multiple plates 810-1, 810-2, 810-3, 810-4, 810-5, 810-6 in the form of lamellae are shown, which are each rotatable about a rotational axis 811. The rotational axes 812 are oriented parallel to the transfer direction of the lubricant from the reservoir unit 100 into the lubricant unit 200. The transfer direction is indicated as an arrow.

As can be seen in particular in FIG. 8a, the plates are slidable against one another such that they at least partially overlap one another in the closed state, as a result of which the opening 108 of the reservoir unit can be closed or opened like a camera shutter. Furthermore, one or more seal elements can again be arranged between the plates, which seal elements seal the interstices of the partially overlapping plates.

The exemplary embodiment according to FIG. 9, on the other hand, shows an embodiment in which the plates in the form of lamellae can be opened or closed in the manner of a Venetian blind. To this end, the plates 910-1, 910-2, 910-3, 910-4, 910-5, 910-6, 910-7 are rotatable about one rotational axis 911 each, which are in this case oriented perpendicularly to the transfer direction of the lubricant from the reservoir unit into the pump unit 200. The plates 910 can be arranged overlappingly, but it is also possible for the plates merely to abut one another in the closed state. To form a sealed closure here too, the plates can have sealing elements 913 at their abutting edges 915, which sealing elements extend over at least one of the adjacent plates and thus seal the abutting edge 915.

Of course, one of the above-described seals can also be used, or the seal described in connection with FIG. 9 can also be used on other exemplary embodiments.

Of course, the pump unit 200 can also be equipped with a closure according to FIG. 8 or 9. It is likewise possible for the pump unit 200 and the reservoir unit 100 to have different closure designs.

LIST OF REFERENCE SIGNS

1 Lubricant pump
100 Reservoir unit
101 Housing
102 Reservoir container
104 Lid element
106 Reservoir housing connection section
108 Opening
110, 112 Plates, disc
114 Guide rod
116 Following disc
118 Spring element
120 Lubricant receiving space
122 Agitator element, agitator blade
130 Closure element
132 Element
134 Sealing elements
136 Window openings in plate 110
138 Covering segment in plate 110
140 Ring element
142 Shaft of agitator blade 122
144 Window opening in plate 112
146 Covering segment in plate 110
150 Lid
152 Seal
154 Projection
156 L-shaped groove
158 Short side
160 Opening to lower edge
162 Long side
164 Stop
170 Engagement receptacle
200 Pump unit
201 Housing
202 First chamber
204 Second chamber
206 Connection section
208 Opening
210, 212 Plates
220, 222 Window openings in plates 210, 212
224, 226 Segments in plates 210, 212
228 Screw
230 Recesses
232 Agitator element
234 Agitator element shaft
240 Projection
242 Seat for reservoir unit
244 Engagement element
252 Sealing element
300 Locking elements, clamps
302 Counterpart
304 Tabs
306 Hook
308 Ring
400 Drive
402 Drive shaft
500 Positioning pin
502 Arcuate recess
504; 506 Stops
810 Camera shutter-like plates
811 Rotational axis, parallel
910 Venetian blind-like plates
911 Rotational axis, perpendicular
913 Seal
915 Abutting edge

What is claimed is:

1. A lubricant pump comprising:
a reservoir unit with a reservoir housing in the form of a reservoir container for storing lubricant, the reservoir housing having a reservoir housing connection section;
a pump unit with a pump device for conveying lubricant out of the reservoir unit to a lubricant consumer, the pump unit having a pump housing with a pump housing connection section;
the pump unit and the reservoir unit being separably connectable to one another, the reservoir housing connection section and the pump housing connection section each having an opening which provides access to an interior of the respective housing, the openings being fluid-connected to one another such that lubricant can be transferred out of the reservoir unit into the pump unit when the housings are in the connected state;

the lubricant pump also comprising:

first and second plates on the pump housing connection section, one of the plates on the pump housing connection section being rotatable relative to the other of the plates on the pump housing connection section to close and open the opening of the pump housing connection section; and/or first and second plates on the reservoir housing connection section, one of the plates on the reservoir housing connection section being rotatable relative to the other of the plates on the reservoir housing connection section to close and open the opening of the reservoir housing connection section.

2. The lubricant pump according to claim 1, wherein the rotation is a sliding rotation of the plates for opening and closing the openings, and the rotation takes place substantially perpendicularly to a transfer direction of the lubricant from the reservoir unit into the pump unit.

3. The lubricant pump according to claim 1, wherein the plates at at least one of the openings are designed as multiple lamellae, each of which is rotatable about its own rotational axis, wherein the rotational axes are substantially parallel or perpendicular to a transfer direction of the lubricant out of the reservoir unit into the pump unit.

4. The lubricant pump according to claim 1, wherein the plates at at least one of the openings are disc-like and rotatable about a common rotational axis, wherein the rotational axis is substantially parallel to a transfer direction of the lubricant out of the reservoir unit into the pump unit.

5. The lubricant pump according to claim 4, wherein the plates each have a window opening, wherein the window openings are configured to be aligned flush with one another by means of the sliding of the plates so that the opening of the reservoir housing connection section and/or the opening of the pump housing connection section is opened or closed.

6. The lubricant pump according to claim 4, wherein the first plate of the pump unit is designed as a pump unit plate which is stationary in relation to the pump housing connection section, and the second plate of the pump unit is designed as a pump unit plate which is movable in relation to the pump housing connection section, and/or the first plate of the reservoir unit is designed as a reservoir unit plate which is stationary in relation to the reservoir housing connection section, and the second plate of the reservoir unit is designed as a reservoir unit plate which is movable in relation to the reservoir housing connection section.

7. The lubricant pump according to claim 6, wherein the stationary pump unit plate is connected to the pump housing by means of a screw fastening, and/or wherein the reservoir unit has a plate insert, wherein the plate insert is connectable to the reservoir housing connection section in a rotationally fixed manner via a frictional fit, and the plate insert is formed integrally with the stationary reservoir unit plate.

8. The lubricant pump according to claim 6, wherein the stationary pump unit plate has at least one engagement element, which is designed to interact with the movable reservoir unit plate such that the movable reservoir unit plate is connectable in a rotationally fixed manner to the stationary pump unit plate and is thus arranged in a stationary manner in relation to the pump unit, and a sliding rotation of the plates of the reservoir unit takes place via a rotation of the reservoir unit in relation to the pump unit so that, when the reservoir unit is rotated, the reservoir unit plate which is stationary in relation to the reservoir unit is moved over the movable reservoir unit plate.

9. The lubricant pump according to claim 6, wherein the stationary reservoir unit plate has at least one coupling element, which is designed to interact with the movable pump unit plate such that the movable pump unit plate is connectable in a rotationally fixed manner to the stationary reservoir unit plate and is thus arranged in a stationary manner in relation to the reservoir unit, and a sliding rotation of the plates of the pump unit takes place via a rotation of the reservoir unit in relation to the pump unit so that, when the reservoir unit is rotated, the stationary reservoir unit plate moves the movable pump unit plate.

10. The lubricant pump according to claim 1, further comprising at least one sealing element arranged between the plates of the reservoir housing connection section and/or the plates of the pump housing connection section.

11. The lubricant pump according to claim 1, wherein the pump unit and/or the reservoir unit are equipped with at least one rotary angle limiting element, which is designed to limit a rotation of the plates against one another to a certain angle.

12. The lubricant pump according to claim 1, wherein the lubricant pump also has at least one securing element, which is designed to secure the plates in their open and/or closed position.

13. The lubricant pump according to claim 1, wherein the reservoir housing connection section and/or the pump housing connection section is equipped with at least one positioning aid to define a certain position between the pump unit and the reservoir unit and/or between the first and the second plate in each case.

14. The lubricant pump according to claim 1, further comprising at least one connection securing element is provided on the pump unit and/or the reservoir unit, which connection securing element is used to secure the separable connection between the pump unit and the reservoir unit.

15. The lubricant pump according to claim 1, wherein the reservoir housing connection section and/or the pump housing connection section has at least one projection, which interacts with at least one recess formed in the respectively other connection section.

16. The lubricant pump according to claim 15, wherein the combination of projection and recess is designed as an actuation element and/or as a positioning aid and/or as a rotary angle limiting element and/or as a securing element.

17. The lubricant pump according to claim 1, wherein the reservoir unit includes a guide rod and a following disc on the guide rod, the following disc configured to apply pressure to the lubricant received in the reservoir container and push the lubricant in the direction of the reservoir housing connection section.

18. The lubricant pump according to claim 1, further comprising an agitator element is arranged in the reservoir unit.

19. The lubricant pump according to claim 1, further comprising an agitator element is arranged in the pump unit, in the region of the pump housing connection section between the plates and the pump device.

20. The lubricant pump according to claim 19, wherein the pump unit has a drive device having a rotatable shaft, and wherein the rotatable shaft is connected in a rotationally fixed manner to the agitator element of the pump unit.

21. The lubricant pump according to claim 4, further comprising at least one sealing element is arranged between the plates of the reservoir housing connection section and/or the plates of the pump housing connection section, wherein the at least one sealing element is arranged around one of the window openings.

22. The lubricant pump according to claim 17, further comprising an agitator element is arranged in the reservoir unit, in the region of the reservoir housing connection section between the plates and the following disc.

23. A lubricant pump comprising:
a reservoir unit with a reservoir housing in the form of a reservoir container for storing lubricant, the reservoir housing having a reservoir housing connection section;
a pump unit with a pump device for conveying lubricant out of the reservoir unit to a lubricant consumer, the pump unit having a pump housing with a pump housing connection section;
the pump unit and the reservoir unit being separably connectable to one another, the reservoir housing connection section and the pump housing connection section each having an opening which provides access to an interior of the respective housing, the openings being fluid-connected to one another such that lubricant can be transferred out of the reservoir unit into the pump unit when the housings are in the connected state;
the lubricant pump also comprising:
first and second plates on the pump housing connection section, which are movable such that the opening of the pump housing connection section is configured to be closed and opened with the first and second plates on the pump housing connection section, and/or
first and second plates on the reservoir housing connection section, which are movable such that the opening of the reservoir housing connection section is configured to be closed and opened with the first and second plates on the reservoir housing connection section;
wherein the movement takes place substantially perpendicularly to a transfer direction of the lubricant from the reservoir unit into the pump unit.

24. The lubricant pump according to claim 23, wherein the movement is a sliding movement of the plates for opening and closing the openings.

25. The lubricant pump according to claim 23, wherein the plates at at least one of the openings are designed as multiple lamellae, each of which is rotatable about its own rotational axis, wherein the rotational axes are substantially parallel or perpendicular to a transfer direction of the lubricant out of the reservoir unit into the pump unit.

26. The lubricant pump according to claim 23, wherein the plates at at least one of the openings are disc-like and rotatable about a common rotational axis, wherein the rotational axis is substantially parallel to a transfer direction of the lubricant out of the reservoir unit into the pump unit.

27. The lubricant pump according to claim 26, wherein the plates each have a window opening, wherein the window openings are configured to be aligned flush with one another so that the opening of the reservoir housing connection section and/or the opening of the pump housing connection section is opened or closed.

28. The lubricant pump according to claim 26, wherein the first plate of the pump unit is designed as a pump unit plate which is stationary in relation to the pump housing connection section, and the second plate of the pump unit is designed as a pump unit plate which is movable in relation to the pump housing connection section, and/or the first plate of the reservoir unit is designed as a reservoir unit plate which is stationary in relation to the reservoir housing connection section, and the second plate of the reservoir unit is designed as a reservoir unit plate which is movable in relation to the reservoir housing connection section.

29. The lubricant pump according to claim 28, wherein the stationary pump unit plate has at least one engagement element, which is designed to interact with the movable reservoir unit plate such that the movable reservoir unit plate is connectable in a rotationally fixed manner to the stationary pump unit plate and is thus arranged in a stationary manner in relation to the pump unit, and a sliding movement of the plates of the reservoir unit takes place via a rotation of the reservoir unit in relation to the pump unit so that, when the reservoir unit is rotated, the reservoir unit plate which is stationary in relation to the reservoir unit is moved over the movable reservoir unit plate.

30. The lubricant pump according to claim 28, wherein the stationary reservoir unit plate has at least one coupling element, which is designed to interact with the movable pump unit plate such that the movable pump unit plate is connectable in a rotationally fixed manner to the stationary reservoir unit plate and is thus arranged in a stationary manner in relation to the reservoir unit, and a sliding movement of the plates of the pump unit takes place via a rotation of the reservoir unit in relation to the pump unit so that, when the reservoir unit is rotated, the stationary reservoir unit plate moves the movable pump unit plate.

31. The lubricant pump according to claim 23, further comprising at least one sealing element arranged between the plates of the reservoir housing connection section and/or the plates of the pump housing connection section.

32. The lubricant pump according to claim 23, wherein the pump unit and/or the reservoir unit are equipped with at least one rotary angle limiting element, which is designed to limit a rotation of the plates against one another to a certain angle.

33. The lubricant pump according to claim 23, wherein the lubricant pump also has at least one securing element, which is designed to secure the plates in their open and/or closed position.

34. The lubricant pump according to claim 23, further comprising at least one connection securing element is provided on the pump unit and/or the reservoir unit, which connection securing element is used to secure the separable connection between the pump unit and the reservoir unit.

35. The lubricant pump according to claim 23, wherein the reservoir housing connection section and/or the pump housing connection section has at least one projection, which interacts with at least one recess formed in the respectively other connection section.

* * * * *